United States Patent [19]

Yuzuriha et al.

[11] Patent Number: 4,628,758
[45] Date of Patent: Dec. 16, 1986

[54] STEERING SHAFT JOINT

[75] Inventors: Naoki Yuzuriha, Zama; Taishiro Mochizuki; Toshinobu Kato, both of Takasaki; Michio Shinohara, Musashino, all of Japan

[73] Assignees: Nissan Motor Co., Ltd., Yokohama; Nippon Seiko Kabushiki Kaisha, Chiyoda, both of Japan

[21] Appl. No.: 681,658

[22] Filed: Dec. 14, 1984

[30] Foreign Application Priority Data

Dec. 19, 1983 [JP] Japan .................. 58-194022[U]

[51] Int. Cl.$^4$ .................. B62D 3/00; B62D 3/12; F16B 3/00
[52] U.S. Cl. .................. 74/498; 74/422; 403/14; 403/359; 403/379
[58] Field of Search .................. 74/422, 498; 403/13, 403/14, 379, 359

[56] References Cited

U.S. PATENT DOCUMENTS

| 2,448,278 | 8/1948 | Ronning | 403/359 |
| 4,189,248 | 2/1980 | Sully | 403/359 X |
| 4,514,108 | 4/1985 | Sagady | 403/359 |

*Primary Examiner*—Allan D. Herrmann
*Attorney, Agent, or Firm*—Leydig, Voit & Mayer

[57] ABSTRACT

A positioning member is installed on a pinion of a steering gear in such a manner that its U-shaped bend forms an alignment mark. A yoke of a steering shaft joint has a slit which forms an alignment mark. The U-shaped bend is insertable into the slit only when the pinion and the steering shaft are properly aligned.

20 Claims, 15 Drawing Figures

STEERING SHAFT JOINT

BACKGROUND OF THE INVENTION

1. Field of the Invention

The present invention relates in general to automotive steering systems and more particularly to a joint for connecting a steering shaft to a steering gear.

2. Description of the Prior Art

FIGS. 1 and 2 show, by way of example, a prior art steering system containing a steering wheel 10, a steering column assembly 12 and a rack and pinion steering gear 14. The steering column 12 has a steering shaft 16 rotatable with the steeing wheel 10, and the steering gear 14 has a pinion 18 and a rack 20 meshed with each other. The steering shaft 16 is connected to the pinion 18 by way of a cross universal joint 22 which is generally called a lower joint.

The lower joint 22 is provided with a yoke 24 connected by means of serrations to the pinion 18. In this connection, in order that dirigible wheels or front wheels of an automotive vehicle are turnable from a straight ahead position to the left and to the right by the same angle, it is required that a neutral position or midpoint position (a position intermediate between opposite lock positions) of the steering wheel 10 and therefore the steering shaft 16 corresponds to the straight ahead position of the front wheels, i.e., it is required that when the steering shaft 16 is placed at the midpoint position, the rack 20 is conditioned so as to be movable to the left and to the right by the same stroke S. It is therefore necessary to couple the steering shaft 16 and the pinion 18 at a predetermined relative position or phase.

FIGS. 3 and 4 show a prior art arrangement for installing the yoke 24 of the lower joint 22 in a predetermined relation to the pinion 18. The pinion 18 is formed with a groove 26 across the axis thereof. The yoke 24 has a tubular portion 28 of a U-like cross section, i.e., a tubular portion 28 having an axial slit 30 extending throughout the length thereof. The tubular yoke portion 28 also has a part-cylindrical serrated inner wall 32 where it is coupled with a correspondingly serrated end 34 of the pinion 18 and a pair of flanges 36 and 36 extending along the slit 30. The flanges 36 and 36 are respectively formed with bolt holes 38 and 40 which are axially aligned with each other to extend across the axis of the tubular portion 28 and therefore the axis of the pinion 18 and one 40 of which is threaded. A bolt 42 is allowed to pass through the bolt hole 38 and screwed into the threaded bolt hole 40 when the bolt holes 38 and 40 are aligned with the groove 26, i.e., the bolt 42 can be installed in place only when the pinion 18 and the yoke 24 are properly aligned with each other. The bolt 42, when installed in place, engages the groove 26 and prevents the pinion 18 or the yoke 24 from slipping off from the other.

Such alignment of the pinion 18 and the yoke 24 must be made by a trial and error method and therefore requires a relatively difficult and lengthy work, resulting in a high production cost. Further, positioning of the groove 26 must be accurate and therefore requires costly machining, resulting in a further increased production cost.

FIGS. 5 and 6 show another prior art arrangement for installing the yoke 24 of the lower joint 22 in a predetermined relation to the pinion 18. In this arrangement, the pinion 18 is formed with an annular peripheral groove 44 for engagement with the bolt 42 and an alignment mark 46 corresponding to the straight ahead position of the front wheels. The slit 30 of the yoke 24 corresponds to the midpoint position of the steering shaft 16. By coupling the pinion 18 and the yoke 24 in such a manner that the mark 46 is aligned with the slit 30, the steering shaft 16 and the pinion 18 can be properly aligned.

A disadvantage of the arrangement of FIGS. 5 and 6 is that the pinion 18 and the yoke 24 can be joined and fastened together by the bolt 42 even when they are not properly aligned, resulting in a possibility of misalignment and a necessity of readjustment.

SUMMARY OF THE INVENTION

In accordance with the present invention, there is provided an improved steering system which comprises a steering shaft, a steering gear having a rotatable input member provided with a serrated end, a joint connecting the steering shaft to the input member and having a yoke connected to the input member, the yoke having a tubular portion formed with a slit extending axially throughout the length thereof and also having a part-cylindrical serrated inner wall at which it is coupled with the serrated end of the input member, the slit being arranged to indicate a predetermined position of the steering shaft, and a positioning member mounted on the input member and held in place by predetermined one of slots defined by serrations of the serrated end of the input member, the positioning member having a projection projecting radially outwardly of the input member, the projection being received in slit and arranged to indicate a predetermined position of the input member.

This structure is quite effective for overcoming the above noted disadvantages inherent in the prior art arrangements.

It is accordingly an object of the present invention to provide an improved steering system for automotive vehicles which can assuredly provide proper alignment of a steering shaft and a steering gear without requiring a difficult coupling operation.

It is another object of the present invention to provide an improved steering gear of the above mentioned character which can assuredly prevents misalignment of the steering shaft and the steering gear input member.

It is a further object of the present invention to provide an improved steering system of the above mentioned character which is readily adoptable to current steering systems.

BRIEF DESCRIPTION OF THE DRAWINGS

The features and advantages of the steering system according to the present invention will become more clearly appreciated from the following description taken in conjunction with the accompanying drawings, in which:

FIGS. 7 to 12 show a steering shaft joint arrangement employed in a steering system according to an embodiment of the present invention, in which FIG. 7 is an enlarged fragmentary view of a steering gear pinion and a positioning member installed thereon, FIG. 8 is a side elevational view of the pinion and the positioning member of FIG. 7, FIG. 9 is an elevational view of the positioning member of FIG. 7, FIG. 10 is an elevational view of a cross universal joint, FIG. 11 is an enlarged side elevational view of a yoke of the joint of FIG. 10 and FIG. 12 is a side elevational view showing an alignment mark on a gear housing with which the positioning member is aligned in order to locate the pinion in its midpoint position.

DETAILED DESCRIPTION OF THE PREFERRED EMBODIMENTS

Referring to FIGS. 7 to 13, in which parts similar to those of the prior art arrangement of FIGS. 1 to 6 are omitted for brevity, an embodiment of the present invention will be described.

Figure 1:
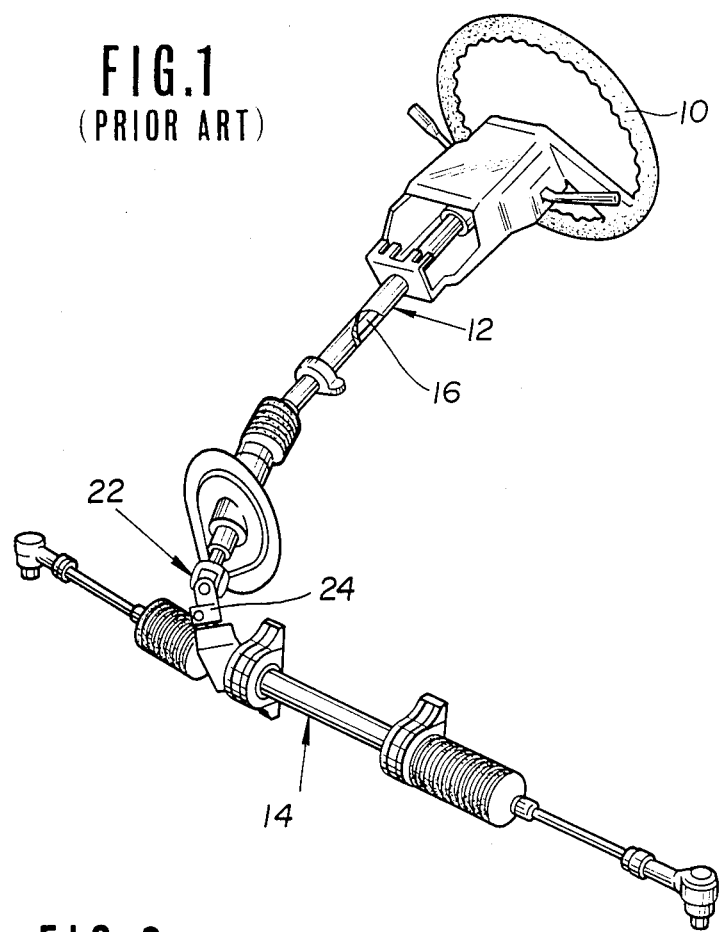
FIG. 1 is a perspective view of a prior art steering system for an automotive vehicle.
Figure 3:
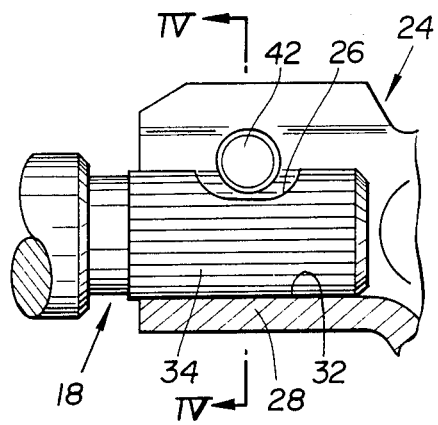
FIG. 3 is a fragmentary sectional view of a prior art steering shaft joint arrangement which can be employed in the steering system of FIG. 1.
Figure 4:
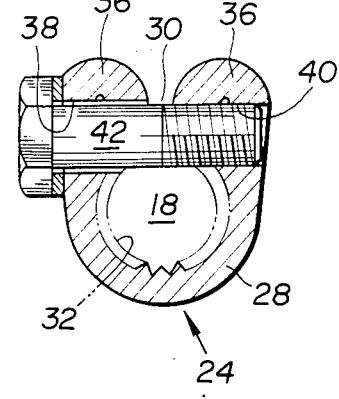
FIG. 4 is a sectional view taken along the line IV—IV of FIG. 3.
Figure 2:
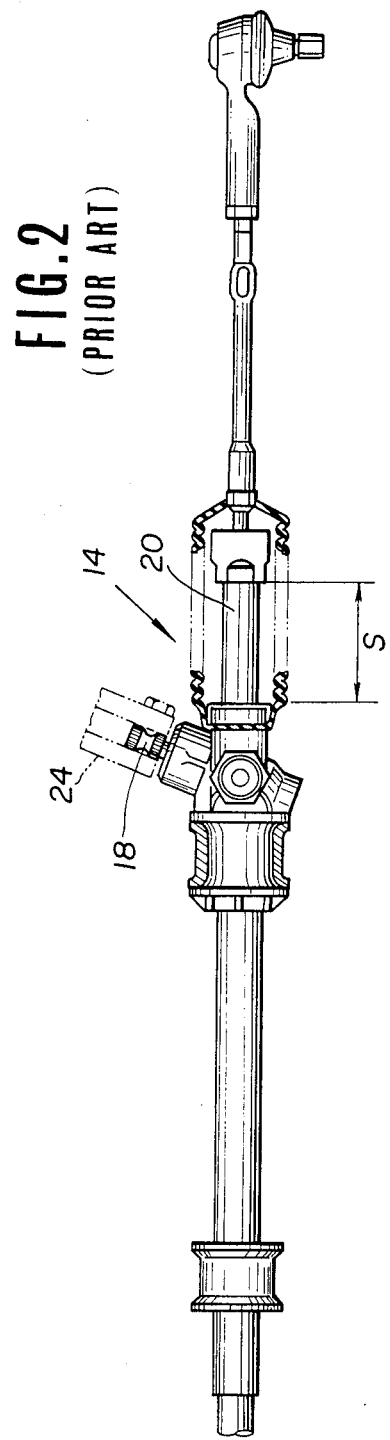
FIG. 2 is a partly sectional view of a rack and pinion steering gear and a steering linkage of the steering system of FIG. 1.
Figure 6:
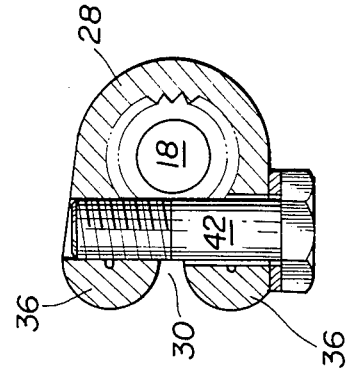
FIG. 6 is a sectional view taken along the line VI—VI of FIG. 5.
Figure 5:
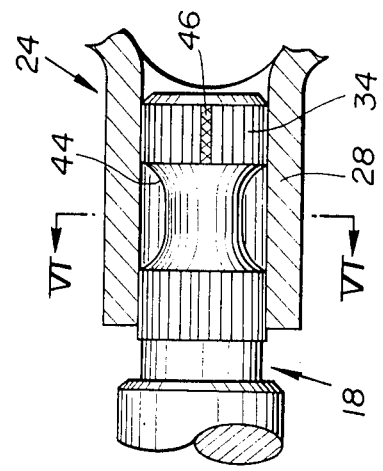
FIG. 5 is a fragmentary sectional view of another prior art steering shaft joint arrangement which can be employed in the steering system of FIG. 1.
Figure 7:
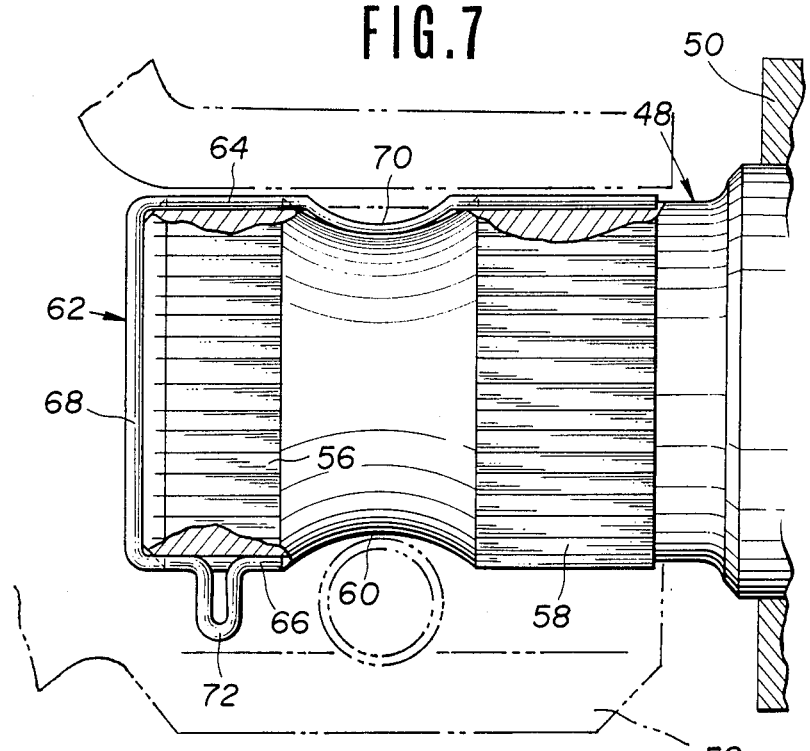
Figure 8:
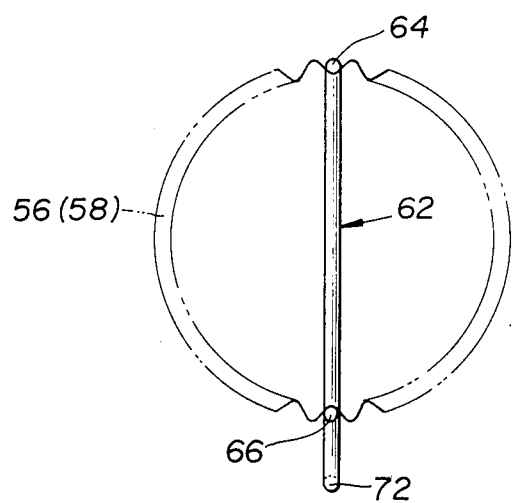
Figure 10:
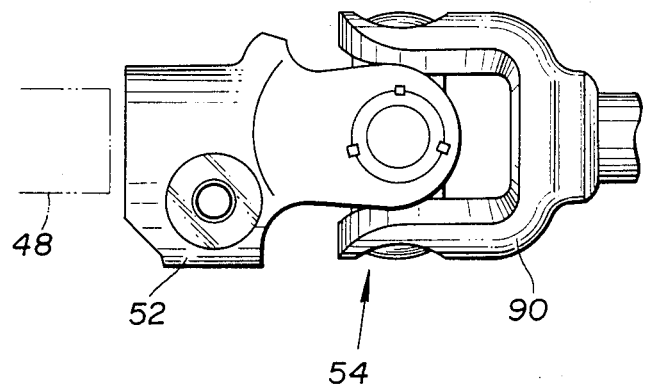
Figure 11:
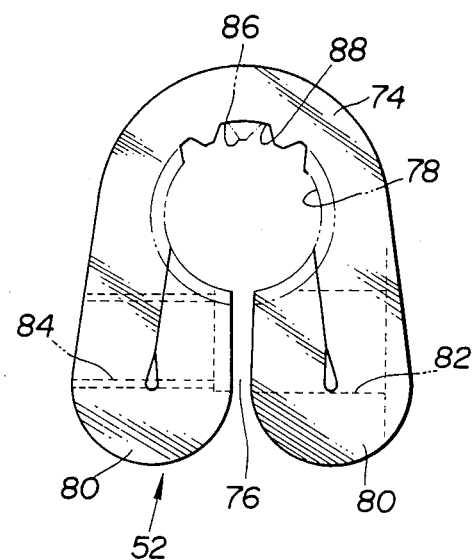

In FIGS. 7 and 8, the reference numeral 48 designates an input member of a steering gear which is shown and described herein as a pinion of a rack and pinion steering gear. The illustrated part of the pinion 48 is the part projecting from a steering gear housing 50 for connection with a yoke 52 of a lower joint 54 as shown in FIG. 10. The pinion 48 has first and second serrated portions 56 and 58 which are axially separated from each other but each of which has serrations aligned with those of the other. The first serrated portion 56 is formed at an end of the pinion 48. The pinion 48 also has an annular peripheral groove 60 between the first and second serrated portions 56 and 58. The groove 60 is crescent-shaped in cross section.

Figure 9:
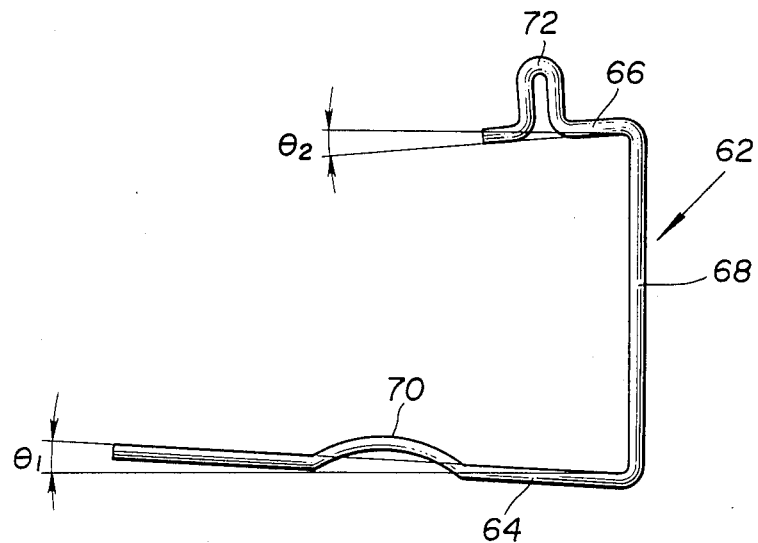

Indicated by the reference numeral 62 is a positioning member formed from a spring wire into a U-like shape and adapted to fit in diametrically opposed slots or grooves in the first and second serrated portions 56 and 58 and held in place on the pinion 48 by the resilience thereof. More specifically, the positioning member 62, as shown in FIG. 9, has nearly parallel first and second arms 64 and 66 and a third arm 68 spanning between the first and second arms 64 and 66, which first, second and third arms 64, 66 and 68 lie on a common plane. The first arm 64 is longer than the second arm 66 so as to extend over the first and second serrated portions 56 and 58, i.e., the first arm 66 has such a length nearly equal to the sum of the axial lengths of the first and second serrated portions 56 and 58 and the annular peripheral groove 60, while the second arm 66 is of such a length as to extend over the first serrated portion 56 only, i.e., of such a length nearly equal to the axial length of the first serrated portion 56. The first arm 64 has a crescent-shaped portion 70 adapted to fit in the groove 60. The second arm 66 has a U-shaped bend 72 which projects in the direction opposite to the first arm 64, i.e., which projects radially outwardly of the pinion 48 when installed in place. The third arm 68 is straight and has a length nearly equal to the diameter of the pinion 48. The first arm 64 is generally straight except for the crescent-shaped portion 70 and forms an angle a little smaller than 90° (90°−$\theta_1$) with the third arm 68 so as to effect a clamping action when the positioning member 62 is installed on the pinion 48. The second arm 66 is generally straight except for the U-shaped bend 72 and forms an angle a little smaller than 90° (90°−$\theta_2$) with the third arm 68 for the same reason as described with respect to the first arm 64. While the first and second arms 64 and 66 of the positioning member 62 are so shaped as to go nearer toward the respective free ends thereof as shown in FIG. 9 when not installed in place on the pinion 48, they become parallel to each other as shown in FIG. 7 when installed in place. By this, the first and second arms 64 and 66 are yieldingly urged toward each other so as to resiliently clamp the pinion 48 therebetween when the positioning member 62 is installed in place.

The yoke 52 of the lower joint 54 has a tubular portion 74 of a U-like cross section, i.e., a tubular portion 74 having an axial slit 76 extending throughout the length thereof. The slit 76 is of the width a little larger than the diameter of the spring wire from which the positioning member 62 is formed. The tubular yoke portion 74 also has a part-cylindrical serrated inner wall 78 for connection with the first and second serrated portions 56 and 58 of the pinion 48 and a pair of flanges 80 and 80 between which the aforementioned slit 76 is defined. The flanges 80 and 80 are formed from folded portions which are respectively bent inwardly and folded together. The flanges 80 and 80 are respectively formed with bolt holes 82 and 84 which are axially aligned with each other to extend across the axis of the yoke portion 74 and therefore the axis of the pinion 48 and one 84 of which is threaded. The part-cylindrical inner wall 78 is formed with serrations in such a manner that one serration 86 diametrically opposing to the slit 76 is cut away to form a slot 88 of an increased width in which circumferentially adjacent two serrations of the pinion 48 can be received at the same time. The lower joint 54 also has another yoke 90 which is connected to a steering shaft 16 (refer to FIG. 1).

The steering gear pinion 48 is coupled with the yoke 52 of the lower joint 54 in the following manner.

Figure 12:
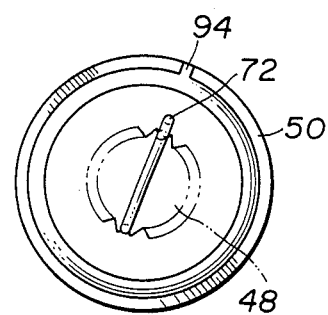

The first and second arms 64 and 66 of the positioning member 62 are pulled in the opposite directions so that the space therebetween is expanded and then engaged with predetermined slots or grooves in the first and second serrated portions 56 and 58 of the pinion 48 as shown in FIG. 7. More specifically, the first arm 64 is engaged with the predetermined slots in the first and second serrated portions 56 and 58 and also with the groove 60 at the crescent-shaped portion 70. The second arm 66 is engaged with the predetermined slot in the first serrated portion 56. The predetermined slot with which the second arm 66 is engaged corresponds to the straight ahead position of the positioning member 62, the pinion 48 may be formed with an alignment mark similarly to the prior art arrangement of FIGS. 5 and 6, or as shown in FIG. 12, the positioning member 62 may be mounted on the pinion 48, under the condition in which the rack 20 (refer to FIG. 2) is movable to the left and to the right by the same stroke S, i.e., the front wheels are held in the straight ahead position, in such a manner that the U-shaped bend 72 of the second arm 66 which projects radially outwardly from the first serrated portion 56 is aligned with an alignment mark 94 formed on the steering gear housing 50. The alignment mark 94 also aligns with the slit 76 of the yoke 52 when the steering wheel 10 (refer to FIG. 10) is in the mid-point position.

The pinion 48 is then inserted together with the positioning member 62 into the yoke 52 of the lower joint 54 by aligning the U-shaped bend 72 with the slit 76 and allowing the former to be inserted into the latter while allowing the first arm 64 and its adjacent two serrations in each pinion serrated portion 56 or 58 to be inserted into the slot 88 in the yoke inner wall 78. The first arm 64 is insertable into the slot 88 together with the adjacent two pinion serrations since the serration 86 of the yoke 52 diametrically opposing to the slit 76 is cut away.

The pinion 48 is insertable into the yoke 52 only when the U-shaped bend 72 of the positioning member 62 is aligned with the slit 76, i.e., only when the pinion 48 is properly aligned with yoke 54. When the pinion 48 is not properly aligned with the yoke 52 upon coupling, the U-shaped bend 72 is caused to strike against the end of the yoke 52 and prevents the pinion 48 from being inserted into the yoke 54 thereby eliminating the possibility of misalignment of the both.

In the above, it is to be noted that the present invention is readily adoptable to the current steering shaft joint arrangements by additionally employing a positioning member only.

It is further to be noted that the spring wire from which the positioning member 62 is formed is of such a diameter as to allow the positioning member 62 to be received within the grooves in the pinion serrated portions 56 and 58 completely and not to project beyond the outer diameter of the pinion serrated portions.

Figure 13:
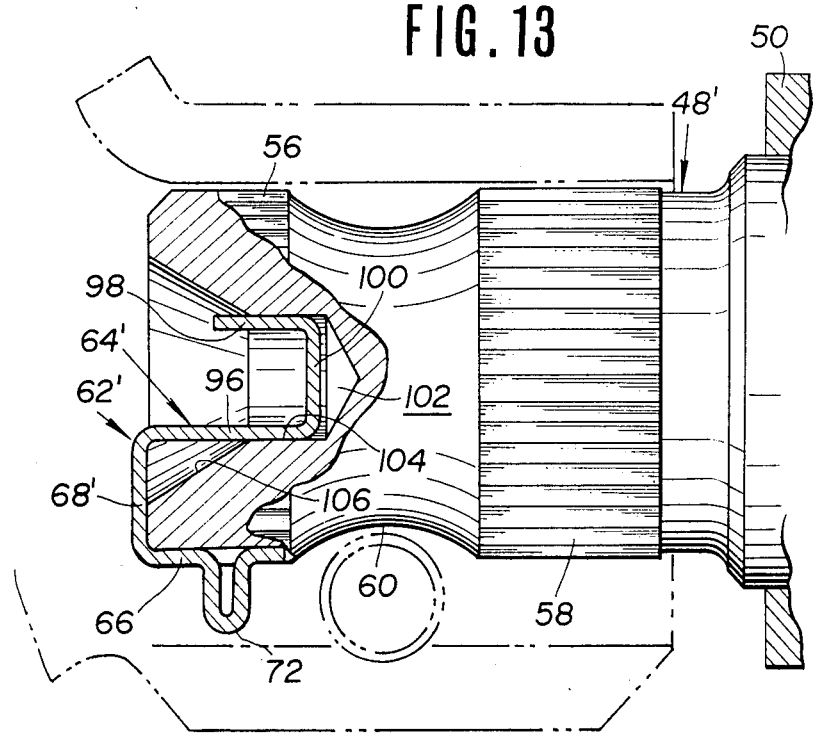
FIGS. 13 to 15 are views similar to FIGS. 7 to 9, respectively but showing a modification of the present invention.
Figure 14:
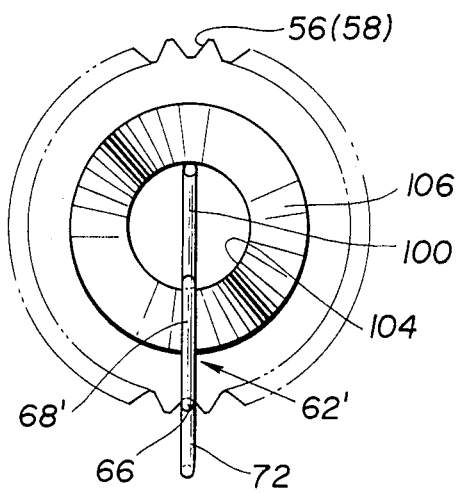
Figure 15:
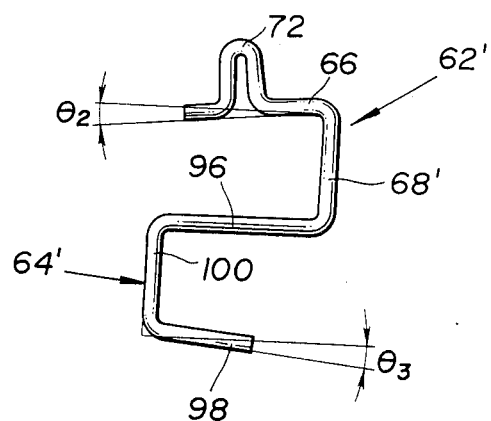

Referring to FIGS. 13 to 15, another embodiment of the present invention will be described. In the figures, parts and portions like or corresponding to those of the previous embodiment are designated by the same reference numerals. Modified parts and portions are designated by the like reference numerals as their corresponding parts and portions, with prime marks added.

In this embodiment, a positioning member 62' is formed into a S-like shape constituted by an L-like portion and a U-like portion. The L-like portion is constituted by a second arm 66 and a third arm 68'. The second arm 66 is substantially similar to that of the previous embodiment and arranged in the same relation to the third arm 68', i.e., the second arm 66 forms an angle a little smaller than 90° (90°−$\theta_2$) with the third arm 68'. The third arm 68' is shorter than that of the previous embodiment for the reason as will be understood as the description proceeds further. The U-shaped portion is constituted by a first arm 64' which includes first and second sections 96 and 98 extending nearly parallely to each other and a third section 100 extending between the first and second sections 96 and 98. The first section 96 extends along the second arm 66 and terminates in an end of the third arm 66' in a manner to make a right angle with the same. The third section 100 forms a right angle with the first section 96 and an angle a little larger than 90° (90°+$\theta_3$) with the second section 98.

A steering gear pinion 48' is formed at an end thereof with a concentric hole 102 having a first hole section 104 of a uniform diameter and a second hole section 106 located nearer to the end of the pinion 48' and flaring toward the same.

Upon installation of the positioning member 62' on the pinion 48', the first arm 64' is fitted in the first hole section 104 of the concentric hole 102, while the second arm 66 is installed in the predetermined groove in the first serrated portion 56 of the pinion 48'.

This embodiment makes it unnecessary to cut away the serration 86 of the yoke 52 opposing to the slit 76. Except for the above, the present invention can produce substantially the same effects as the previous embodiment.

While the present invention has been described and shown as applied to a steering system of the kind having a rack and pinion steering gear, it is not limited to this but can be applied to other types of steering systems, e.g., a steering system of the kind having a worm and sector steering or a recirculating-ball steering.

What is claimed is:

1. A steering system comprising:
   a steering shaft;
   a steering gear having a rotatable input member provided with a serrated end;
   a joint connecting said steering shaft to said input member and having a yoke connected to said input member, said yoke having a tubular portion formed with a slit extending axially through the length thereof and also having a part-cylindrical serrated inner wall at which it is coupled with said serrated end of said input member, said slit being arranged to indicate a predetermined position of said steering shaft; and
   a positioning member mounted on said input member and held in place by predetermined one of slots defined by serrations of said serrated end of said input member, said positioning member having a projection projecting radially outwardly of said input member, said projection being received in said slit and arranged to indicate a predetermined position of said input member.

2. A steering system as set forth in claim 1, in which said positioning member is formed from a thin, flexible, continuous length of material of circular cross section into an U-like shape and comprises first and second parallel arms and a third arm extending therebetween, said second arm being received in said one slot and said first arm being received in another one of said slots diametrically opposing to said one slot, said second arm having a U-shaped bend forming said projection of said positioning member, said third arm extending across said input member along an edge thereof.

3. A steering system as set forth in claim 2, in which said material from which said positioning member is formed is a spring wire.

4. A steering system as set forth in claim 2, in which said slit is of such a width that is approximately equal to but slightly larger than the diameter of the material from which said positioning member is formed.

5. A steering system as set forth in claim 4, in which said inner wall of said yoke has a slot of an increased width, said increased-width slot being formed by cutting away one of said serrations of said inner wall which diametrically opposes to said slit, said first arm of said positioning member and its adjacent serrations of said input member being received in said increased-width slot.

6. A steering system as set forth in claim 5, in which said serrated end of said input member has first and second serrated portions which are axially separated from each other but each of which has serrations aligned with those of the other, said input member also having an annular peripheral groove of a crescent-shaped cross section between said first and second serrated portions, said joint further having a bolt extending across said tubular portion and engaged with said groove of said input member to hold said serrated portions of said input member in said yoke.

7. A steering system as set forth claim 6, in which said first arm is longer than said said second arm and received in said another slot defined by serrations of said first serrated portion and another slot defined by serrations of said second serrated portion, said first arm having a crescent-shaped portion which fits in said crescent-shaped groove of said input member.

8. A steering system as set forth claim 7, in which said second arm is received in said predetermined slot defined by serrations of said first serrated portion of said input member.

9. A steering system as set forth in claim 8, in which said first, second and third arms of said positioning member are formed so as to lie on a common plane.

10. A steering system as set forth in claim 9, in which said steering gear further has a gear housing from which said serrated end of said input member projects, said steering gear housing being formed with an alignment mark with which said bent portion of said positioning member and said slit of said yoke are alignable at the same time.

11. A steering system as set forth in claim 10, in which said first and second arms of said positioning member are yieldingly urged toward each other so as to resiliently clamp said input member therebetween.

12. A steering system as set forth in claim 1, in which said positioning member is formed from a thin, flexible, continuous length of material of circular cross section into an S-like shape and comprises a first arm forming an U-like portion of said S-like shape and second and third arms forming an L-like portion of said S-like shape, said input member being formed at an end thereof with a concentric hole in which said first arm is fitted, said second arm having a U-like bend forming said projection and received in said slot, said third arm spanning between said first and second arms and positioned at an edge of said input member in a manner to halfway cross the same.

13. A steering system as set forth in claim 12, in which said material from which said positioning member is formed is a spring wire.

14. A steering system as set forth in claim 12, in which said slit is of such a width that is approximately equal to but slightly larger than the diameter of the material from which said positioning member is formed.

15. A steering system as set forth in claim 14, in which said serrated end of said input member has first and second serrated portions which are axially separated from each other but each of which has serrations aligned with those of the other, said input member also having an annular peripheral groove of a crescent-shaped cross section between said first and second serrated portions, said joint further having a bolt extending across said tubular portion and engaged with said groove of said input member to hold said serrated portions of said input member in said yoke.

16. A steering system as set forth in claim 15, in which said second arm is received in said predetermined slot defined by serrations of said first serrated portion.

17. A steering system as set forth in claim 16, in which said first, second and third arms of said positioning member are formed so as to lie on a common plane.

18. A steering system as set forth in claim 16, in which said steering gear further has a gear housing from which said serrated end of said input member projects, said steering gear housing being formed with an alignment mark with which said U-shaped bent portion of said positioning member and said slit of said yoke are alignable at the same time.

19. A steering system as set forth in claim 18, in which said first and second arms of said positioning member are yieldingly urged toward each other so as to resiliently clamp said input member therebetween.

20. A steering system as set forth in claim 1, in which said steering gear is a rack and pinion steering gear, and said input member is a pinion thereof.

* * * * *